(12) United States Patent
Tao et al.

(10) Patent No.: US 10,724,424 B2
(45) Date of Patent: Jul. 28, 2020

(54) POWER CYLINDER APPARATUS FOR REDUCING UNBURNT HYDROCARBON EMISSIONS

(71) Applicant: CUMMINS INC., Columbus, IN (US)

(72) Inventors: Feng Tao, Columbus, IN (US); Timothy P. Lutz, Zionsville, IN (US)

(73) Assignee: Cummins Inc., Columbus, IN (US)

(*) Notice: Subject to any disclaimer, the term of this patent is extended or adjusted under 35 U.S.C. 154(b) by 331 days.

(21) Appl. No.: 15/573,346

(22) PCT Filed: May 15, 2015

(86) PCT No.: PCT/US2015/031138
§ 371 (c)(1),
(2) Date: Nov. 10, 2017

(87) PCT Pub. No.: WO2016/186620
PCT Pub. Date: Nov. 24, 2016

(65) Prior Publication Data
US 2018/0135507 A1 May 17, 2018

(51) Int. Cl.
*F02B 23/08* (2006.01)
*F02F 3/28* (2006.01)
(Continued)

(52) U.S. Cl.
CPC .......... *F02B 23/08* (2013.01); *F02B 23/0618* (2013.01); *F02B 23/0627* (2013.01);
(Continued)

(58) Field of Classification Search
CPC ............. F02B 23/0672; F02B 23/0627; F02B 23/0618; F02F 3/28
See application file for complete search history.

(56) References Cited

U.S. PATENT DOCUMENTS 1,110,332 A * 9/1914 Miller .......................... 123/73 A
1,741,032 A * 12/1929 Minter .................... F02B 23/08
123/657

(Continued)

FOREIGN PATENT DOCUMENTS

EP 0 237 065 9/1987
EP 1 474 593 11/2004
(Continued)

OTHER PUBLICATIONS

Ijin Marine Limited, Website with photos, online, Ijin Marine Limited, 2013, retrieved Nov. 9, 2017, retrieved from the Internet: <URL: http://ijinmarnie.blogspot.com/2013/10/piston-skirt-piston-rod-and-trunk-piston.html>.

(Continued)

*Primary Examiner* — Hung Q Nguyen
(74) *Attorney, Agent, or Firm* — Foley & Lardner LLP

(57) ABSTRACT

Internal combustion engine apparatuses, systems and methods. The internal combustion engine system includes a cylinder block including a cylinder bore and a piston movably positioned in the cylinder bore. The piston is configured to slide in an axial direction within the cylinder bore. The piston includes a piston crown and a turbulence induction protuberance extending in an axial direction from the piston crown. The turbulence induction protuberance is positioned radially intermediate an axial center of the piston and a circumferential portion of the piston. The turbulence induction protuberance is configured to cause turbulence in a propagating flame propagating from a central region of the cylinder bore to cause the propagating flame to extend to a circumferential portion of the cylinder bore.

25 Claims, 14 Drawing Sheets

(51) Int. Cl.
*F02B 23/06* (2006.01)
*F02B 23/02* (2006.01)

(52) U.S. Cl.
CPC ............ *F02B 23/0672* (2013.01); *F02F 3/28* (2013.01); *F02B 23/02* (2013.01); *Y02T 10/125* (2013.01)

(56) References Cited

U.S. PATENT DOCUMENTS

| | | | | |
|---|---|---|---|---|
| 2,269,084 A * | 1/1942 | McCarthy | ............... | F02B 23/00 123/298 |
| 2,760,475 A * | 8/1956 | Bodine, Jr. | ............... | F02F 3/28 123/265 |
| 3,083,700 A * | 4/1963 | Kerr | .................... | F02B 23/0672 123/276 |
| 3,240,193 A * | 3/1966 | Ephraim, Jr. | ......... | F02F 3/0076 123/41.35 |
| 3,456,638 A * | 7/1969 | Bodine | ................... | F02B 23/00 123/660 |
| 3,583,373 A | 6/1971 | Hardenberg | | |
| 4,009,702 A * | 3/1977 | Mayer | ....................... | F02F 3/28 123/193.6 |
| 4,177,769 A * | 12/1979 | Okada | ................ | F02B 23/0639 123/193.6 |
| 4,359,027 A * | 11/1982 | Scharpf | .................... | F02B 23/08 123/193.3 |
| 4,389,986 A * | 6/1983 | Tanasawa | ................. | F02B 1/08 123/298 |
| 4,501,236 A * | 2/1985 | Fletcher | ................ | F02B 77/085 123/193.6 |
| 4,541,377 A * | 9/1985 | Amos | ..................... | F02B 23/00 123/193.6 |
| 4,617,888 A * | 10/1986 | Dent | ......................... | F02F 3/28 123/193.6 |
| 4,788,942 A * | 12/1988 | Pouring | ................ | F02B 17/005 123/219 |
| 5,195,486 A * | 3/1993 | Ishii | ........................ | F02B 19/04 123/257 |
| 5,320,075 A | 6/1994 | Regueiro | | |
| 5,970,945 A * | 10/1999 | Holtermann | .......... | F02B 23/104 123/259 |
| 6,152,122 A | 11/2000 | Hampson et al. | | |
| 6,170,454 B1 * | 1/2001 | McFarland | ............... | F02F 3/28 123/193.6 |
| 6,220,215 B1 * | 4/2001 | Morimoto | ............. | F02B 17/005 123/193.6 |
| 6,336,437 B1 * | 1/2002 | Baika | .................... | F02B 23/104 123/298 |
| 6,615,789 B2 * | 9/2003 | Inoue | .................... | F02B 23/104 123/193.6 |
| 7,073,478 B2 | 7/2006 | Zoller | | |
| 7,341,053 B2 | 3/2008 | Kitada et al. | | |
| 7,681,564 B2 | 3/2010 | Umierski et al. | | |
| 8,056,532 B2 | 11/2011 | Shibata et al. | | |
| 8,459,229 B2 * | 6/2013 | Rothbauer | .......... | F02B 23/0651 123/276 |
| 8,776,760 B2 * | 7/2014 | Stovell | ............... | F02B 23/0651 123/298 |
| 10,060,386 B2 * | 8/2018 | Eismark | ............. | F02B 23/0651 |
| 2007/0044755 A1 * | 3/2007 | Lehmann | .................. | F02F 3/10 123/307 |
| 2008/0135007 A1 * | 6/2008 | Storm | ................. | F02B 23/0654 123/143 C |
| 2009/0188481 A1 | 7/2009 | Zhu et al. | | |
| 2011/0253095 A1 * | 10/2011 | Rothbauer | ................ | F02F 3/26 123/276 |

FOREIGN PATENT DOCUMENTS

JP 2000-507664 10/1997
WO WO-2012/125961 9/2012

OTHER PUBLICATIONS

International Search Report from corresponding PCT Application No. PCT/US2015/031138, dated Aug. 21, 2015, p. 1.

* cited by examiner

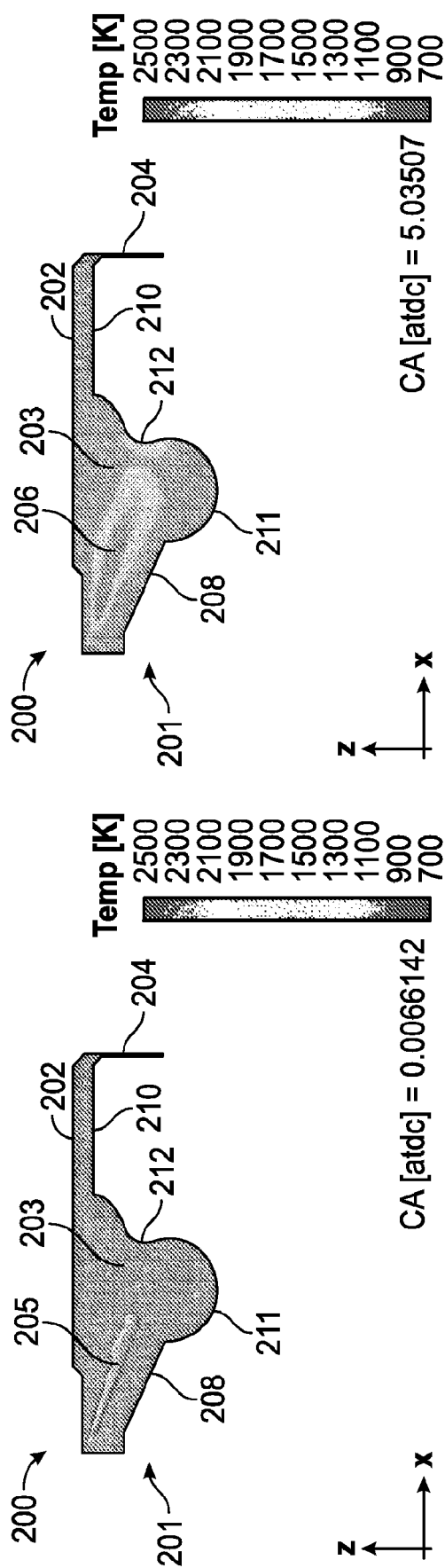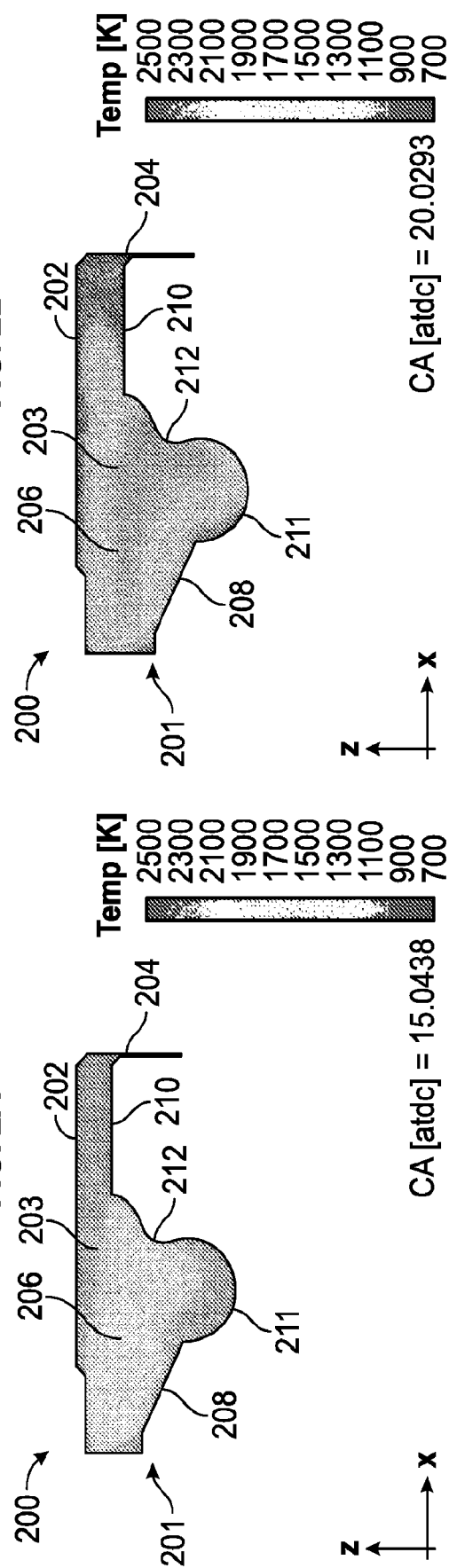

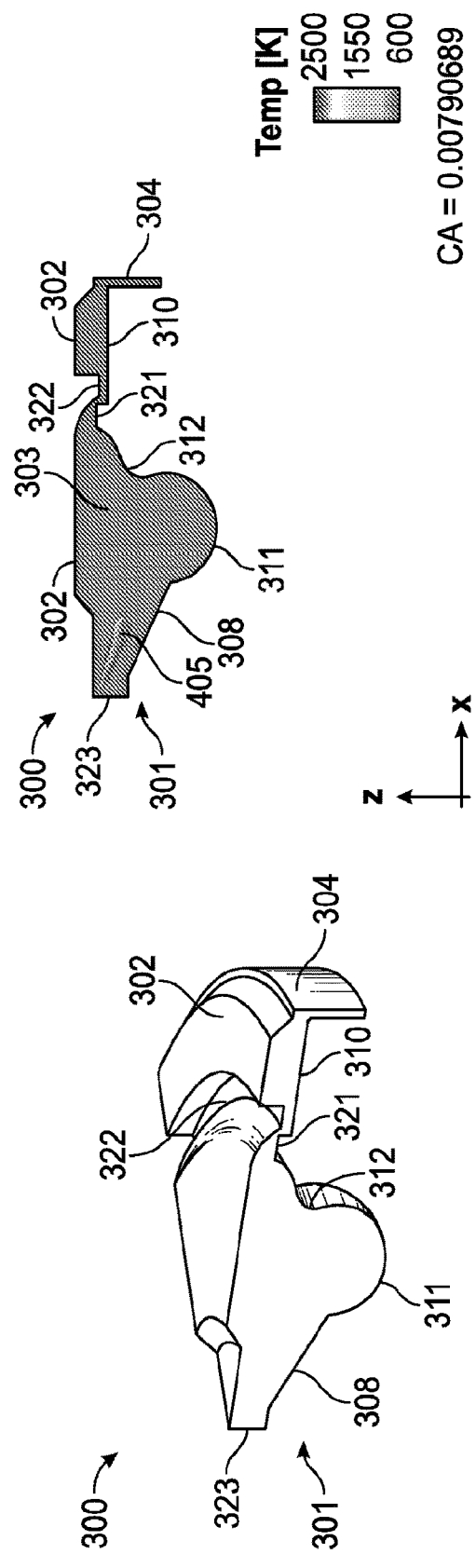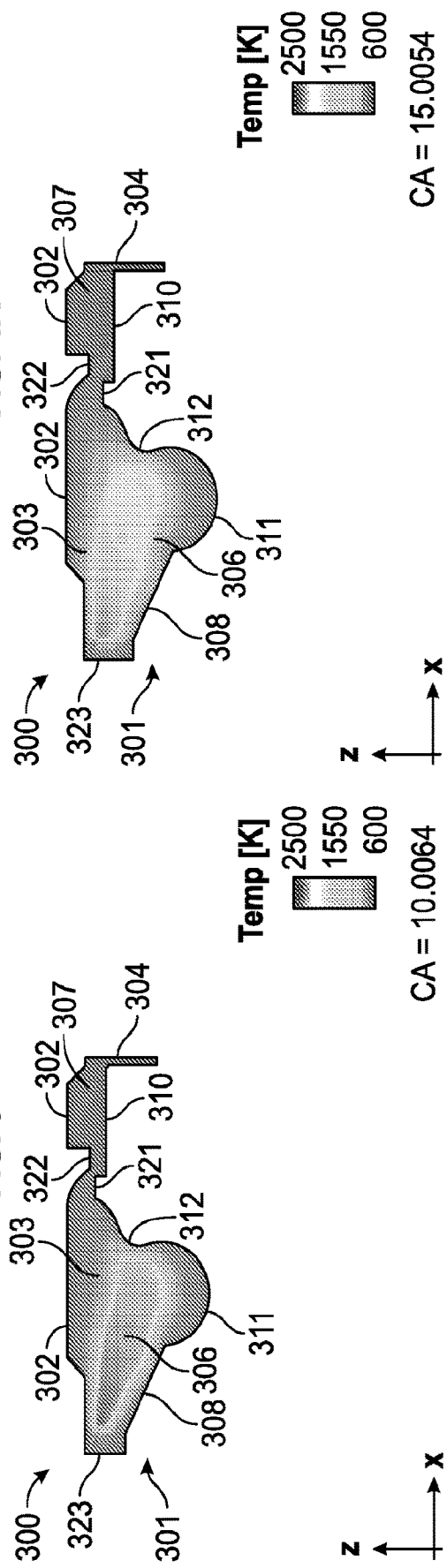

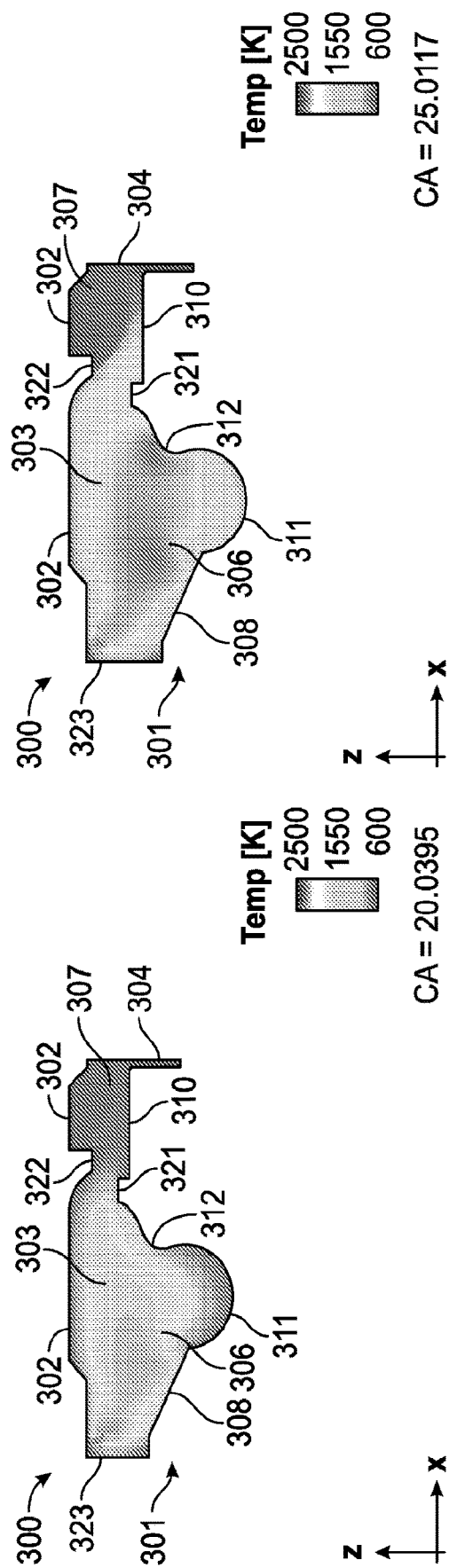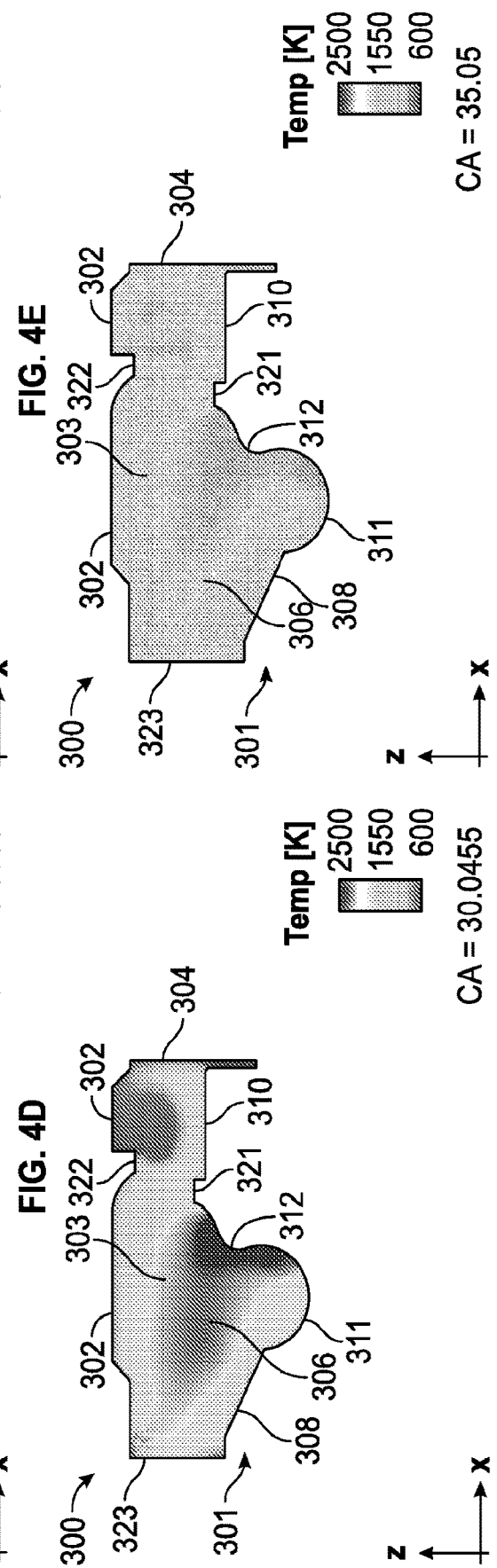

CA [atdc] = 10.0174

CA [atdc] = 20.0319

CA [atdc] = 5.00785

CA [atdc] = 15.0375

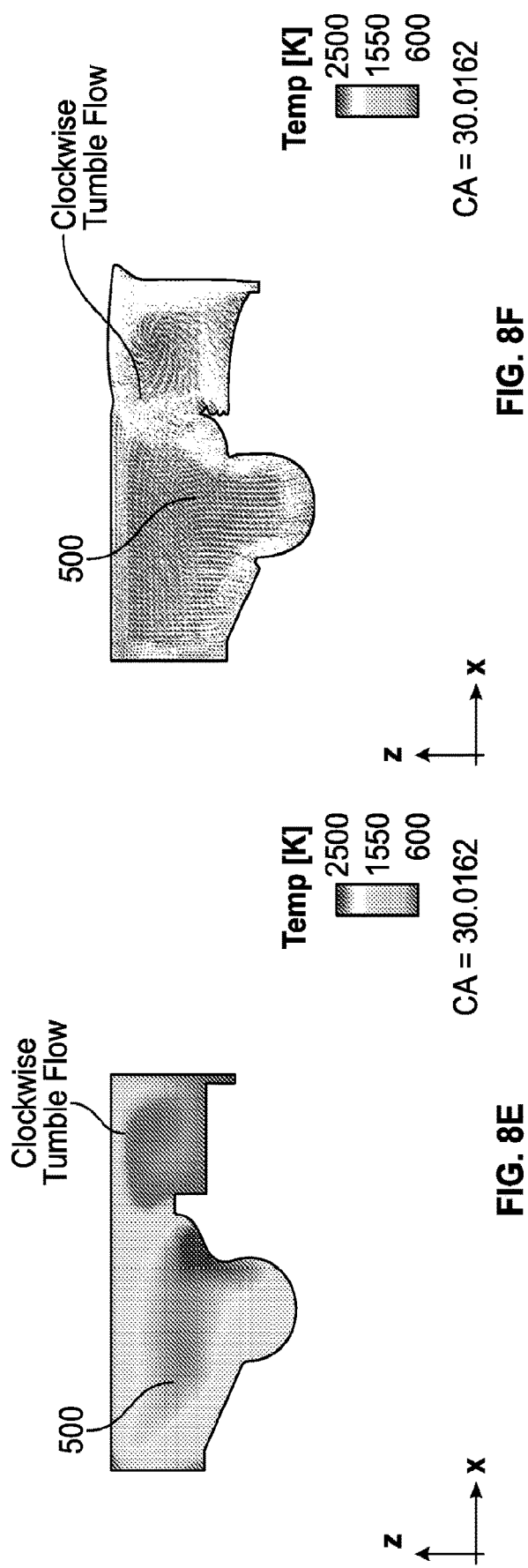

POWER CYLINDER APPARATUS FOR REDUCING UNBURNT HYDROCARBON EMISSIONS

CROSS-REFERENCE TO RELATED APPLICATIONS

This application claims the benefit of and priority to PCT Application No. PCT/US2015/031138, filed on May 15, 2015, the contents of which are incorporated herein by reference in their entirety.

TECHNICAL FIELD

The present disclosure relates to internal combustion engine components and systems for reducing unburnt hydrocarbon emissions.

BACKGROUND

Power production in an internal combustion engine is achieved through the combustion of fuel inside the cylinder of the engine. The fuel inserted into the combustion chamber may be ignited under compression or via spark depending upon the fuel involved. The fuel may include one or more fuels and may be liquid and/or gaseous fuels. Combustible fuels used for such power production include, but are not limited to, one or more of diesel fuel, gasoline, natural gas and alcohol (ethanol) fuels.

Power production and the efficiency of an internal combustion engine are impacted by the quantity and rate of combustion of the fuel. If, for example, the fuel provided to the cylinders or combustion chambers of the internal combustion engine is not completely consumed or combusted during the combustion process, some of the unburnt fuel is to be exhausted in a form of unburnt hydrocarbon emissions from the engine during the exhaust process. The unburnt hydrocarbons represents a loss of combustion efficiency and power of the engine.

Various government emissions regulations prescribe the amount of unburnt hydrocarbons that are acceptable for release into the atmosphere. Accordingly, in order to comply with such regulations, exhaust systems coupled to an internal combustion engine include various exhaust aftertreatment systems configured to treat and/or eliminate the unburnt hydrocarbons. Such aftertreatment systems may include various catalysts such as diesel oxidation catalyst, three way catalysts, or other exhaust treatment components.

Accordingly, operating an internal combustion engine that releases unburnt hydrocarbons is disadvantageous in view of the associated components implemented to treat the exhaust and in view of the reduced power and efficiency of the engine.

SUMMARY

Various embodiments disclosed herein provide internal combustion engine apparatuses, systems, and methods for turbulence induction to accelerate and increase combustion efficiency and reduce unburned hydrocarbon emissions.

A first set of embodiments provides an internal combustion engine system including a cylinder block including a cylinder bore and a piston movably positioned in the cylinder bore. The piston is slidable in an axial direction within the cylinder bore. The piston includes a piston crown. The piston crown includes a turbulence induction protuberance extending in an axial direction from the piston crown. The turbulence induction protuberance is positioned radially intermediate an axial center of the piston and a circumferential portion of the piston. The turbulence induction protuberance is configured to cause turbulence in a propagating flame propagating from a central region of the cylinder bore to enhance the ability of the propagating flame to extend to a circumferential portion of the cylinder bore.

A second set of embodiments provides an internal combustion engine system including a cylinder block including a plurality of cylinder bores and a plurality of pistons. Each cylinder bore in the plurality of cylinder bores includes a piston from the plurality of pistons. The piston is slidable in an axial direction within the respective cylinder bore. The piston includes a piston crown. The piston crown includes a turbulence induction protuberance extending in an axial direction from the piston crown. The turbulence induction protuberance is positioned radially intermediate an axial center of the piston and a circumferential portion of the piston. The turbulence induction protuberance is configured to cause turbulence in a propagating flame propagating from a central region of the respective cylinder bore so as to enhance the ability of the propagating flame to extend to a circumferential portion of the respective cylinder bore.

A third set of embodiments provides an internal combustion engine system subassembly including a cylinder block defining a cylinder bore. A piston is slidable in an axial direction within the cylinder bore. The piston includes a piston crown. The piston crown includes a turbulence induction protuberance extending in an axial direction from the piston crown. The turbulence induction protuberance is positioned radially intermediate an axial center of the piston and a circumferential portion of the piston. The turbulence induction protuberance configured to cause turbulence in a propagating flame propagating from a central region of the cylinder bore so as to enhance the ability of the propagating flame to extend to a circumferential portion of the cylinder bore.

A fourth set of embodiments provides a method including causing a first fuel and intake air to enter the intake system of an internal combustion engine, drawing the first fuel and intake air into a cylinder bore of the internal combustion engine, injecting a second fuel into the cylinder bore so as to initiate ignition of a propagating flame, sliding a piston movably positioned in the cylinder bore in an axial direction within the cylinder bore, and interrupting propagation of the propagating flame via a turbulence induction protuberance. The turbulence induction protuberance extends in the axial direction from a piston crown of the piston. The turbulence induction protuberance is positioned radially intermediate an axial center of the piston and a circumferential portion of the piston. Interrupting propagation of the propagating flame with the turbulence induction protuberance is configured to cause a turbulence in the propagating flame. The turbulence in the propagating flame enhances the ability of the propagating flame to extend to a circumferential portion of the cylinder bore.

The inventors have appreciated that described embodiments provide systems and methods that accelerate and increase fuel combustion in the combustion chamber or cylinder of an engine thereby leading to reduced hydrocarbon emissions and improving combustion efficiency. The inventors have also appreciated that described embodiments provide systems and methods that may permit an engine system architecture that excludes a diesel oxidation catalysts, yet operates within regulated limits for hydrocarbon emissions.

It should be appreciated that all combinations of the foregoing concepts and additional concepts discussed in greater detail below (provided that such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIGS. 2A-2H are progressive views of a half cylinder during combustion and at various crank angles.

FIG. 3 is a perspective view of a cylinder and piston portion including turbulence induction features in accordance with an embodiment.

FIGS. 4A-4H are progressive views of the cylinder and piston portion of FIG. 3 during combustion and at various crank angles.

FIGS. 8A-8F are comparative views of cylinder and gas flow patterns during combustion.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive internal combustion engine systems and methods of operating internal combustion engine systems. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
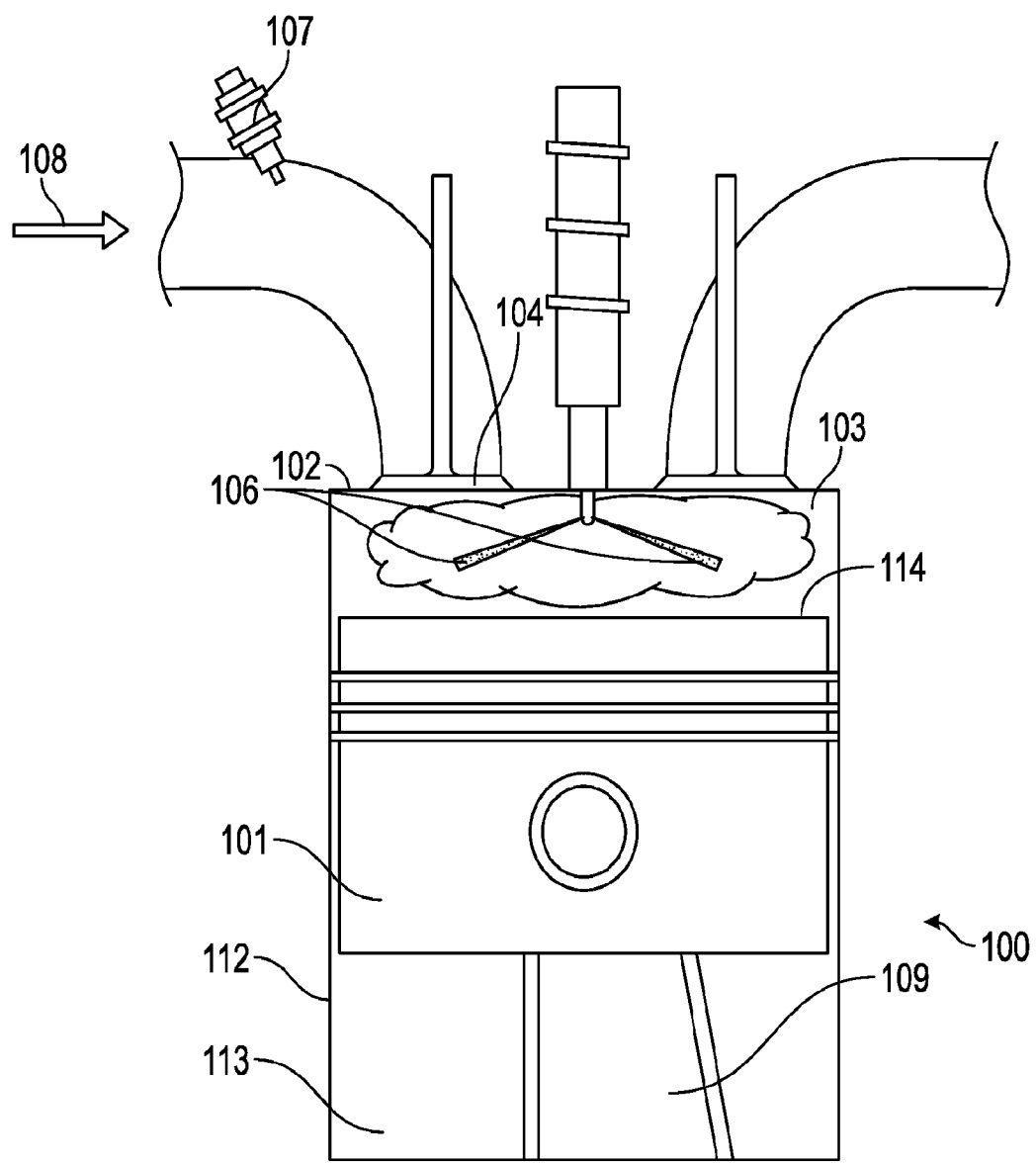
FIG. 1 is a side cross-sectional view of a dual fuel engine including a turbulence induction apparatus in accordance with an embodiment.

FIG. 1 is a side cross-sectional view of a portion of a dual fuel engine including a turbulence induction apparatus in accordance with an embodiment. An internal combustion engine system portion 100 is shown. The internal combustion engine system portion 100 includes a cylinder block 112, forming a cylinder bore 113 and housing a piston 101. The piston 101 is configured for axial displacement in the cylinder bore 113. The cylinder block 112 includes a cylinder head 102 coupled thereto. The piston 101 is coupled to a connecting rod 109 which is coupled to a crankshaft. The crankshaft is turned as the piston 101 is displaced under force from combustion in a combustion chamber 103.

The internal combustion engine system portion 100 represented in FIG. 1 is configured for dual-fuel operation. Accordingly, the internal combustion engine system portion 100 receives both air 108 and natural gas via an intake valve 104. The mixture is introduced into the combustion chamber 103. The internal combustion engine system portion 100 injects diesel fuel 106 into the mixture of air 108 and natural gas 107. The compression of the intake air 108 and natural gas from a natural gas control valve 107 causes the diesel fuel 106 to ignite or combust upon injection. The combustion causes the piston 101 to be displaced. As described further herein, at least one of the piston crown 114 of the piston 101 and the cylinder head 102 includes one or more features that accelerate and/or increase combustion of the natural gas to reduce hydrocarbon emissions and improve combustion efficiency, by inducing turbulence in the combustion process.

Figure 2E:
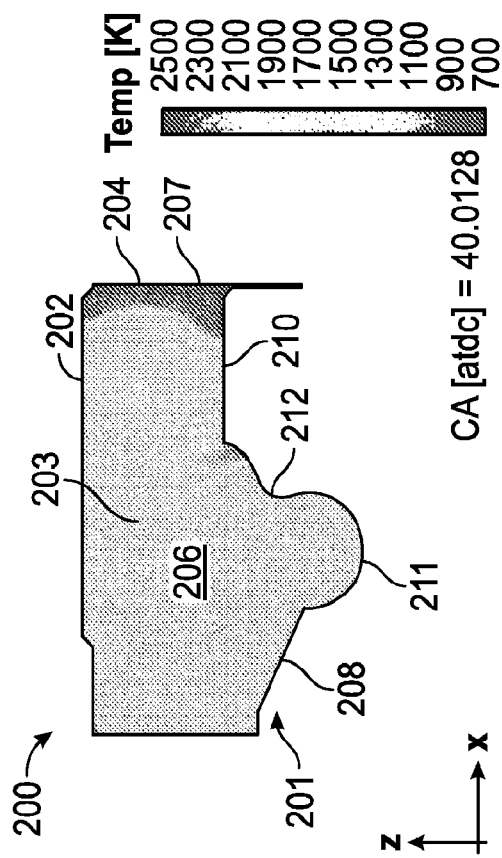

FIGS. 2A-2H are progressive views of a half of a cylinder during combustion and at various crank angles in a conventional arrangement. Each of the FIGS. 2A through 2H illustrate the in-cylinder process of dual fuel (e.g. diesel/natural gas) combustion. FIGS. 2A through 2H are an outline of half of a cylinder system 200 of an internal combustion engine at varying crank angles of the crankshaft, which angles correspond to axial displacement of a piston of the engine within a cylinder bore of the cylinder system 200. In particular, the outline represents a lower surface of a cylinder head portion 202, a sidewall surface of a cylinder liner 204 positioned against a circumferential wall portion of the cylinder system 200, and an upper surface of a piston 201. The sidewall surface of the cylinder liner 204 is cylindrically shaped and corresponds to the shape of the circumferential wall portion of the cylinder system 200. The piston 201 includes an angled "ski jump" portion 208, a curved piston bowl portion 211, a fuel target portion 212, and a flat crown 210. The angled "ski jump" portion 208 is a substantially conical surface extending from a center for the cylinder system 200 to the curved piston bowl portion 211. The curved piston bowl portion 211 has a generally concave curved shape and is positioned between the "ski jump" portion 208 and the fuel target portion 212. The ski jump portion 208, the curved piston bowl portion 211, and the fuel target portion 212 are positioned axially below the crown 210. As fuel, such as diesel fuel is sprayed into a piston cylinder at the fuel target portion 212, the fuel target portion 212 splits the fuel spray such that a portion rolls downward into the curved piston bowl portion 211 and toward the center of the cylinder (i.e. radially inward) while another portion moves ahead of the target (i.e. radially outward). The fuel target portion 212 is the projected target for fuel injected into the cylinder system 200 as shown in FIG. 2A.

Figure 2F:
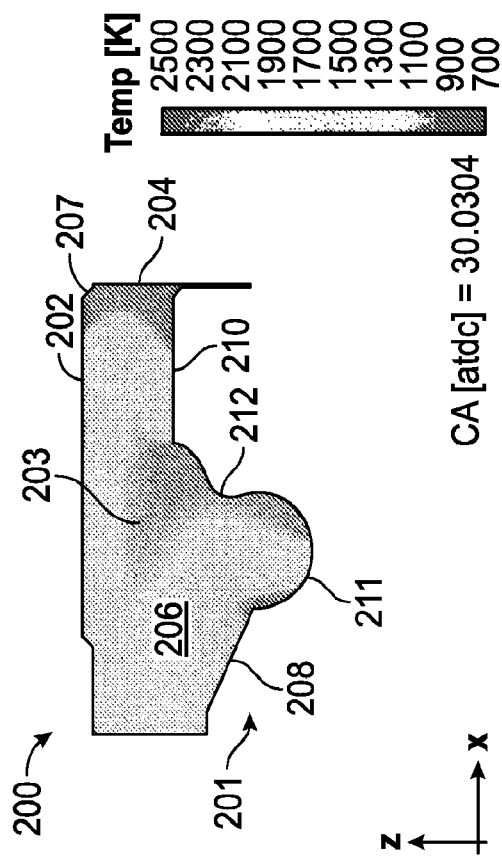
Figure 2G:
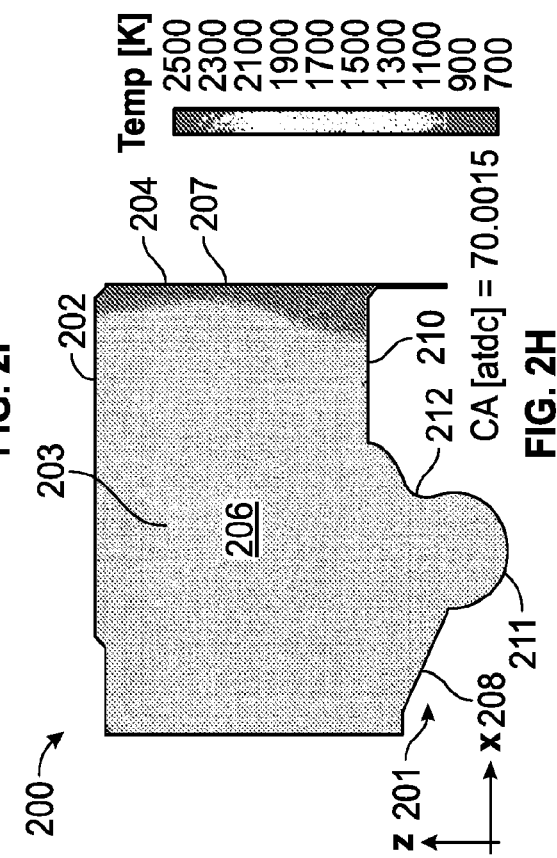
Figure 2H:
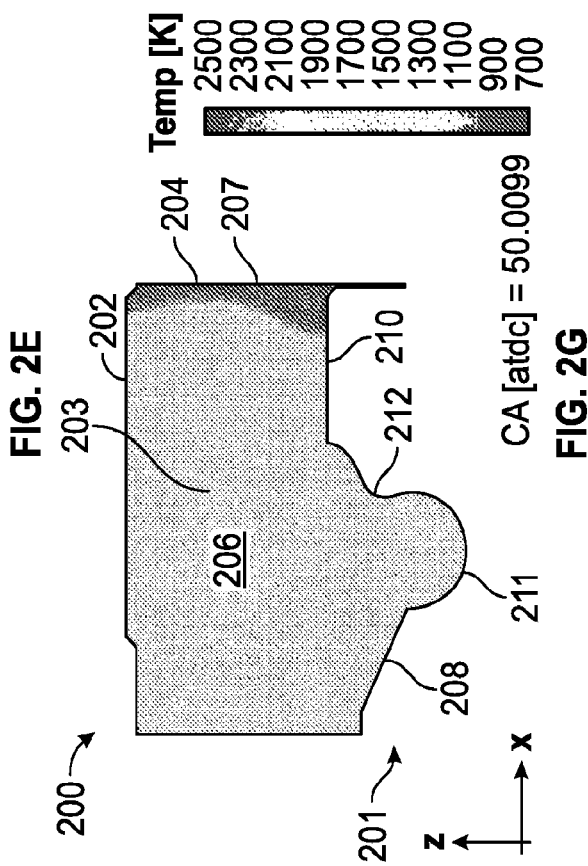

FIG. 2A shows the piston at the top dead center position with the crank angle at approximately 0 degrees. At the top dead center position illustrated in FIG. 2A, a fuel such as diesel fuel 205 is injected into the cylinder system 200. The cylinder system 200 contains a mixture of a second fuel, natural gas, and air in a combustion chamber 203 of the cylinder system 200. The compression of air and natural gas contained in the cylinder system 200 causes the diesel fuel 205 injected into the cylinder system 200 to ignite into a propagating flame 206 as demonstrated in FIG. 2B. In FIG. 2B, the pressure increase generated by combustion in the combustion chamber 203 of the cylinder system 200 moves the piston 201 axially downward away from the cylinder head portion 202 such that the volume of the combustion chamber 203 between the piston 201 (specifically the head of the piston) and the cylinder head portion 202 increases. In FIG. 2B, the crank angle of the crankshaft connected to the piston has increased to approximately 5 degrees. FIGS. 2C-2H illustrate continued expansion of the propagating flame 206 within the cylinder system 200 as the piston continues to move downward. The piston displacement in FIGS. 2C-2H corresponds to the following crank angles: approximately 20, 30, 40, 50, and 60 degrees respectively. The cylinder system 200 of FIGS. 2A-2H show a cylinder embodiment that does not include a turbulence induction protuberance as discussed further herein. As shown in FIGS. 2F-2H, the expansion of the propagating flame 206 fails to reach and consequently combust a boundary hydrocarbon layer 207 of the air and natural gas positioned along a circumferential wall portion of the cylinder liner 204. Accordingly, a portion of the hydrocarbons drawn into the cylinder system 200 remain unburnt and unused, which decreases engine efficiency and increases unburned hydrocarbon exhaust emissions.

FIG. 3 is a perspective view of a schematic of a cylinder and piston portion including turbulence induction features in accordance with another embodiment. FIG. 3 shows the profile of a piston 301 of the cylinder system 300. The piston 301 includes an angled "ski-jump" portion 308, a curved piston bowl portion 311, a fuel target portion 312, a piston turbulence induction protuberance 321, and a peripheral piston flat portion 310. The angled "ski jump" portion 308 is a substantially conical surface extending from a center for the cylinder system 300 to the curved piston bowl portion 311. The curved piston bowl portion 311 has a generally concave curved shape and is positioned between the "ski jump" portion 308 and the fuel target portion 312. The piston turbulence induction protuberance 321 has a step profile as discussed further herein. The piston turbulence induction protuberance 321 extends from the piston crown 301 in an axial direction (e.g. along the axis of displacement of the piston in the cylinder bore). The piston turbulence induction protuberance 321 is positioned radially from the intermediate axial center 323 of the cylinder system 300 and a cylindrical wall 304 of at least one of a cylinder liner positioned in a cylinder bore of the cylinder system 300 or the circumferential wall of the cylinder bore of the cylinder system 300. Accordingly, the piston turbulence induction protuberance 321 is configured to cause turbulence in a propagating flame propagating from an axial center 323 of the cylinder system 300. The turbulence causes the propagating flame to extend to a circumferential portion of the cylinder bore, cylindrical wall 304, as further demonstrated in FIGS. 4A-4H. The fuel target portion 312 is the location on the piston 301 at which the fuel injected from the center of the cylinder system 300 into the combustion chamber is aimed at. The injected fuel, which includes, but is not limited to, a diesel injection, is generally sprayed into the combustion chamber 303 at an angle such that the diesel injection is substantially orthogonal to at least a portion of the fuel target portion 312. In the illustrated embodiments, the piston turbulence induction protuberance 321 extends directly from the fuel target portion 312 of the piston 301. While inventive embodiments disclosed herein are demonstrated by way of example with a piston including features such as a fuel target portion, a ski jump portion, and a curved piston bowl portion, inventive embodiments are not limited to pistons including such features. Similarly, example inventive embodiments disclosed herein may be implemented with pistons operational with various non-diesel fuels including, but not limited to, natural gas, gasoline, ethanol or pistons operable with other combustible fuels. Various inventive embodiments may be provided with a piston including other features in the piston crown including, but not limited to, valve pockets.

The cylinder system 300 also includes a cylinder head portion 302. The cylinder head portion 302 includes a cylinder head turbulence induction protuberance 322. The cylinder head turbulence induction protuberance 322 also has a stepped profile. The cylinder head turbulence induction protuberance 322 is positioned between the cylindrical wall 304 and the piston turbulence induction protuberance 321. In example embodiments, the cylinder head turbulence induction protuberance 322 may be implemented on the cylinder head portion 302 without the piston turbulence induction protuberance 321. The cylinder head turbulence induction protuberance 322 also extends in an axial direction, but extends in a direction opposite the piston turbulence induction protuberance 321. The cylinder head turbulence induction protuberance 322 extends in an axial direction from the cylinder head portion 302 (e.g. toward the piston crown 301). Accordingly, the cylinder system 300 includes a series of turbulence induction protuberances. The piston turbulence induction protuberance 321 and the cylinder head turbulence induction protuberance 322 are generally composed of the same material as the component from, which they extend (e.g. piston crown 301, cylinder head portion 302), but they may be composed of a material distinct from those surfaces, in accordance with example embodiments. As demonstrated further, the piston turbulence induction protuberance 321 and the cylinder head turbulence induction protuberance 322 may each include rounded step edges in some embodiments and pointed edges in some embodiments. The stepped profile may include two axial extending side walls connected by a radial extending top wall in accordance with example embodiments.

FIGS. 4A-4H are progressive views of the cylinder and piston portion of FIG. 3 during combustion and at various crank angles. Each of the FIGS. 4A through 4H illustrate the in-cylinder process of dual fuel (e.g. diesel/natural gas) combustion. While various inventive embodiments disclosed herein are discussed with respect dual-fuel engines, the inventive embodiments disclosed herein are not limited thereto and may be implemented with single fuel engines, spark ignited engines, or dual-fuel engines operating with fuels other than diesel and natural gas. FIGS. 4A-4H are side views of cylinder system 300 during fuel injection and combustion. In contrast to the cylinder system 200 of FIGS. 2A-2H, the cylinder system 300 include turbulence induction protuberances 321 and 322.

Figure 4H:
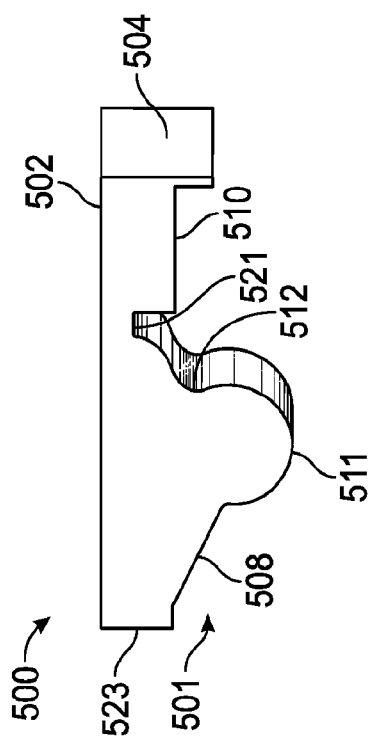

FIG. 4A illustrates the cylinder system 300 at top dead center, with the crank angle at approximately 0 degrees and during a diesel fuel injection 405. At the time of the diesel fuel injection 405, the cylinder system 300 contains a mixture of a second fuel including, but not limited to, natural gas, and air in the combustion chamber 303. The compression of the air and the natural gas contained in the cylinder system 300 cause ignition of the diesel fuel injection 405 upon injection and to produce a propagating flame 306. This is shown in FIG. 4B, which illustrates the cylinder system at approximately a 10 degree crank angle. As demonstrated in FIG. 4C, the propagating flame 306 propagates toward the fuel target portion 312, generating an increase in pressure which in turn forces unburned gas/air mixture in the cylinder ahead of the propagating flame 306 towards the cylinder wall 304. The flow within the combustion chamber 303 created by the forcing of unburned gas/air mixture towards the cylinder wall 304 is interrupted by the piston turbulence induction protuberance 321 and cylinder head turbulence induction protuberance 322, generating a rotational tumbling motion and turbulence in the region of the combustion chamber 303 located axially between the piston turbulence induction protuberance and cylinder wall 304 In FIG. 4D, the propagating flame expands to the piston turbulence induction protuberance 321, which causes the propagating flame 306 to tumble thereby further inducing turbulence into the flow of the propagating flame 306. The tumbling propagating flame 306 continues to expand in FIG. 4E, tumbling into the cylinder head turbulence induction protuberance 322, which as shown in FIG. 4F causes the propagating flame 406 to tumble. As demonstrated in FIGS. 4G and 4H, the propagating flame 306 continues to propagate turbulently extending all the way to the cylindrical wall 304 so that boundary layer portions 307 of the air and natural gas in the combustion chamber 303 are consumed by the propagating flame 306. Accordingly, through the combustion cycle the cylinder system 300 consumes more of the hydrocarbons than cylinder system 200 and at a faster or accelerated pace. Accordingly, the cylinder system 300 is more efficient and with fewer unburned hydrocarbon emissions than the cylinder system 200, as the quantity of unburnt hydrocarbons are reduced by the transformation of the propagating flame caused by the turbulence induction protuberances 321 and 322.

Figure 5:
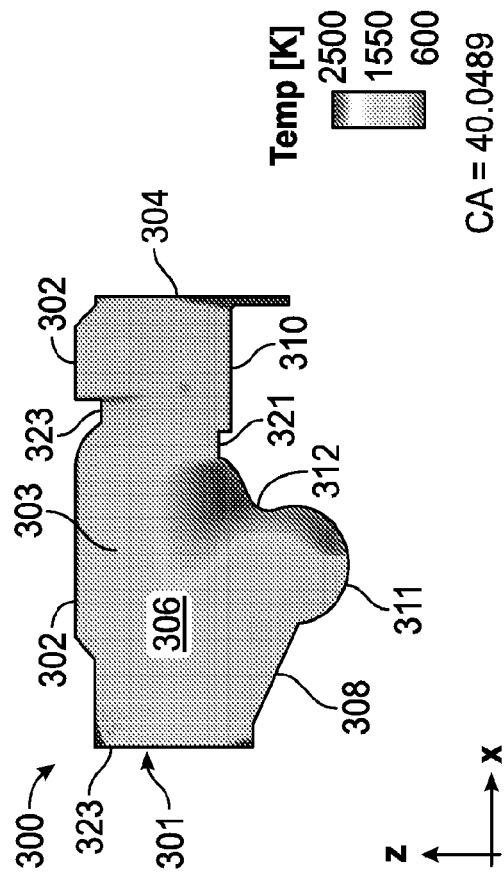
FIG. 5 is a perspective view of a cylinder and piston portion including a turbulence induction feature on the piston crown in accordance with an embodiment.

FIG. 5 is a perspective view of a cylinder and piston portion including a turbulence induction feature on the piston in accordance with another embodiment. A cylinder system 500 is similar to cylinder system 300, but cylinder system 500 does not include a cylinder head turbulence induction protuberance. The cylinder system 500 includes only a single turbulence induction protuberance, a piston turbulence induction protuberance 521, which extends from a piston 501. The piston 501 includes an angled "ski-jump" portion 508, a curved piston bowl portion 511, a fuel target portion 512, the piston turbulence induction protuberance 521, and a piston crown 510. The angled "ski jump" portion 508 is a substantially conical surface extending from a center for the cylinder system 500 to the curved piston bowl portion 511. The curved piston bowl portion 511 has a generally concave curved shape and is positioned between the "ski jump" portion 308 and the fuel target portion 512. The cylinder system 500 also includes a cylinder head portion 502.

Figure 6:
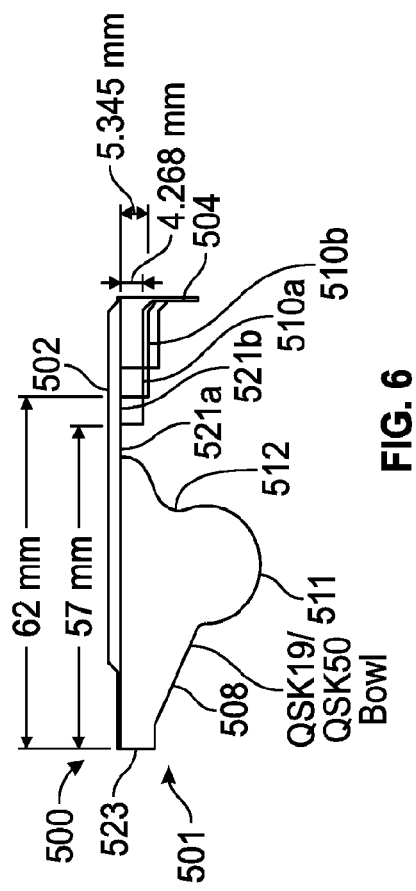
FIG. 6 is a side view of the cylinder and piston portion of FIG. 5 that illustrates three variations in design of the turbulence induction feature.

FIG. 6 is a side view of the cylinder and piston portion of FIG. 5. The cylinder system 500 is shown in FIG. 6 with examples of variations in the size of the piston turbulence induction protuberance 521. As demonstrated in FIG. 6, the piston turbulence induction protuberance 521 may be modified by increasing the width, the depth, and/or its distance from the axial center 523 to a circumferential portion 504 of the cylinder system 500. In example embodiments, the piston turbulence induction protuberance 521 is positioned at or over 70% of the radial distance from the axial center 523 to the circumferential portion 504 of the cylinder system 500. In example embodiments, the piston turbulence induction protuberance 521 is positioned in the range of at least one of 60%-90%, 70%-80%, and 70% to 75% of the radial distance from the axial center 523 to the circumferential portion 504 of the cylinder system 500. In example embodiments, the piston turbulence induction protuberance 521 is positioned at least one of 60%, 65%, 70%, 71%, 72%, 73%, 74%, 75% 80%, 85%, and 90% of the radial distance from the axial center 523 to the circumferential portion 504 of the cylinder system 500. In example embodiments, the piston turbulence induction protuberance 521 has a height in the range of 3-7 mm. In example embodiments, the piston turbulence induction protuberance 521 has a height in the range of 4-6 mm (with respect to the peripheral piston flat portion)

Figure 7A:
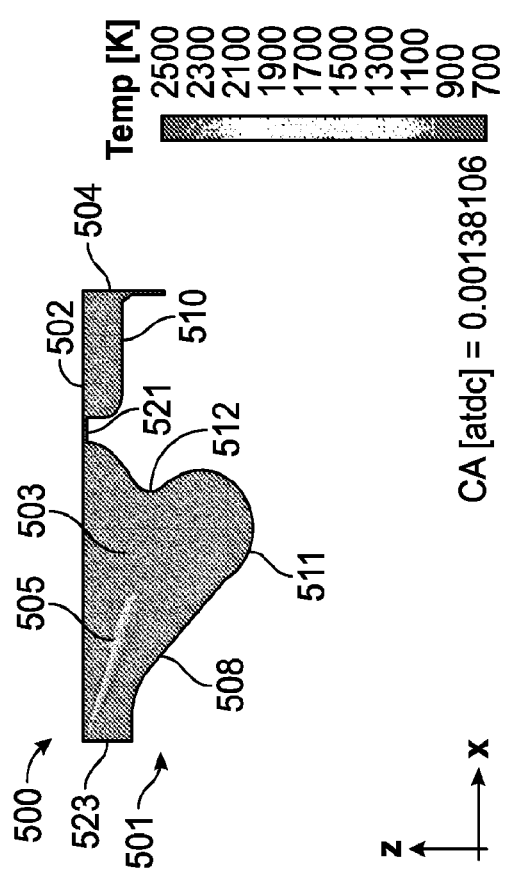
FIGS. 7A-7H are progressive views of the cylinder and piston portion of FIG. 5 during combustion and at various crank angles.
Figure 7C:
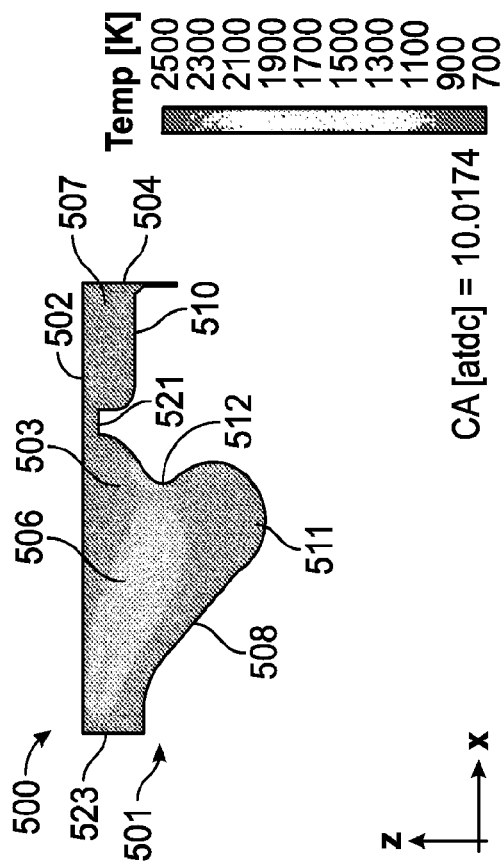
Figure 7E:
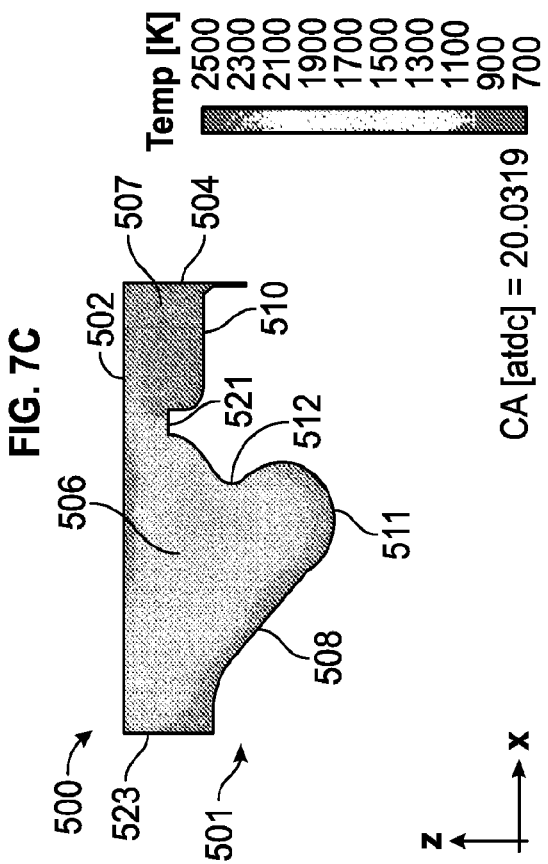
Figure 7B:
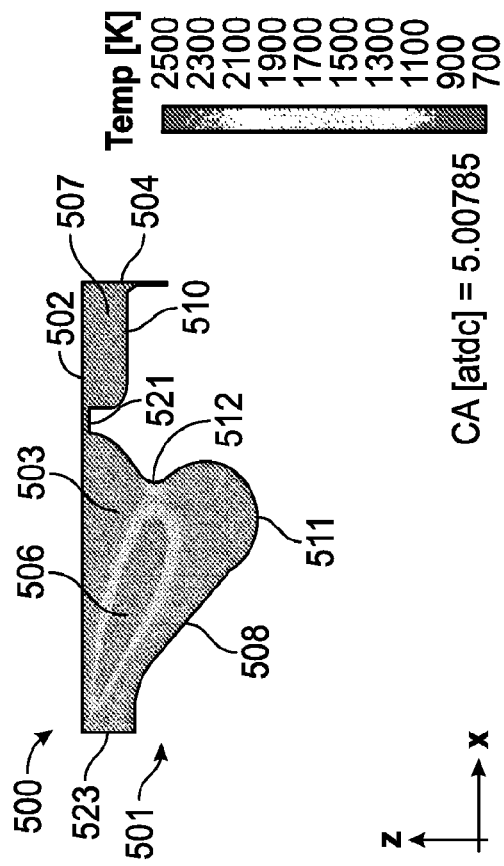
Figure 7D:
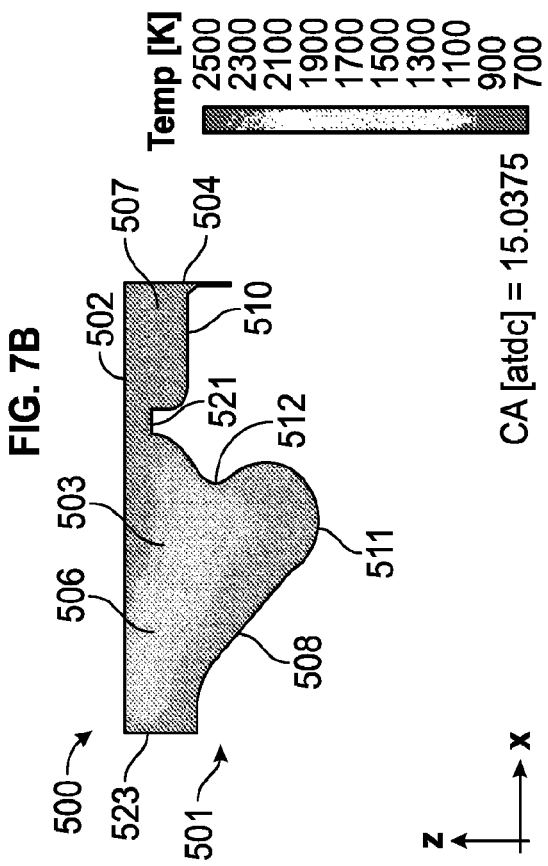
Figure 7F:
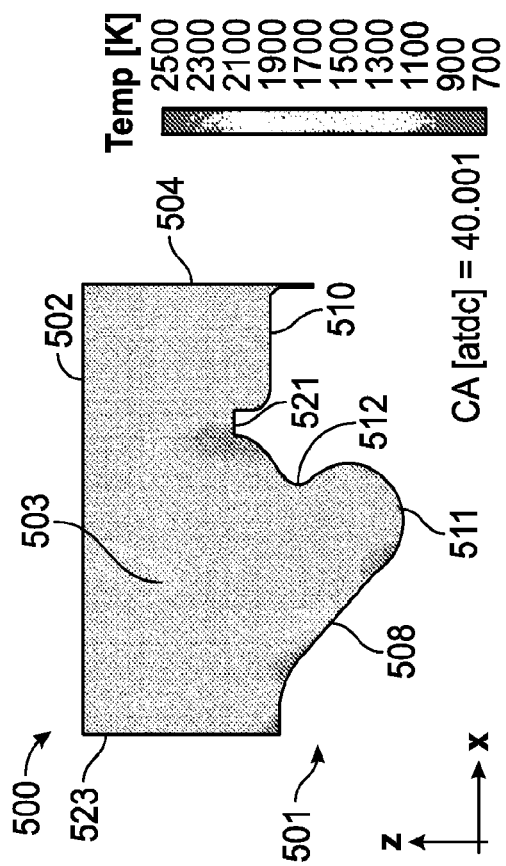
Figure 7G:
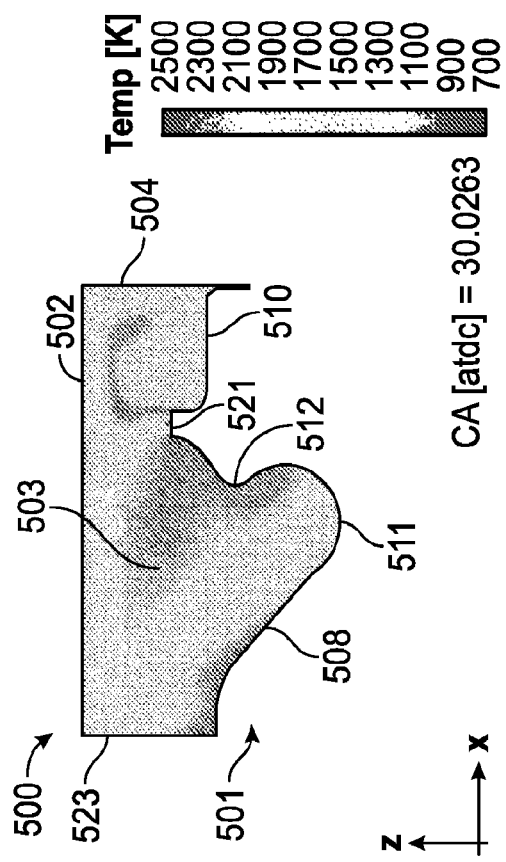
Figure 7H:
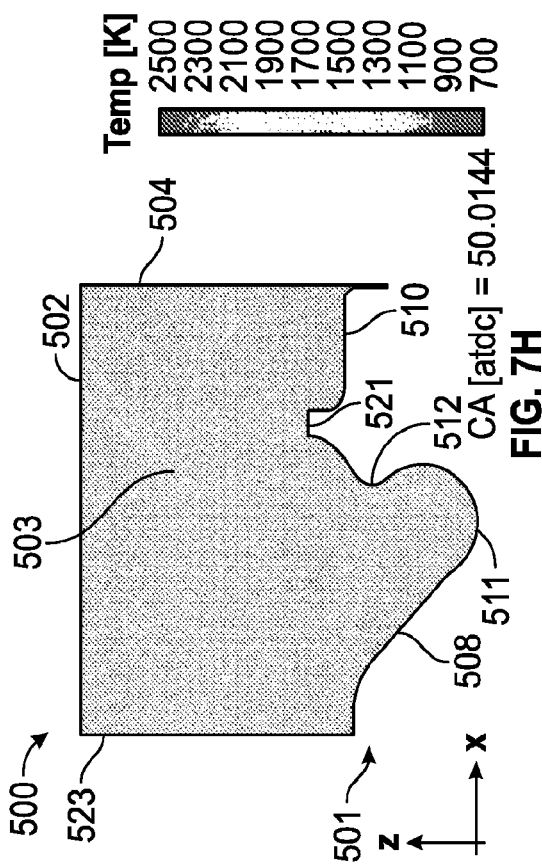

FIGS. 7A-7H are progressive views of the cylinder and piston portion of FIG. 5 during combustion and at various crank angles. The piston displacements in FIGS. 7A-7H correspond to the following crank angles: approximately 0, 5, 10, 15, 20, 30, 40, and 50 degrees respectively. FIG. 7A illustrates the cylinder system 500 at top dead center with the crank angle at approximately 0 degrees and during a diesel fuel injection 505. At the time of the diesel fuel injection 505, the cylinder system 500 contains a mixture of a second fuel including, but not limited to, natural gas, and air in the combustion chamber 503. The compression of the air and the natural gas contained in the cylinder system 500 cause ignition of the diesel fuel injection 505 upon injection to produce a propagating flame 506 shown in FIG. 7B. The propagating flame 506 extends to the fuel target portion 512 in FIGS. 7C-7D. The propagating flame 506 contacts the piston turbulence induction protuberance 521 as shown in FIG. 7E. The piston turbulence induction protuberance 521 causes the propagating flame 506 to tumble thereby inducing turbulence into the flow of the propagating flame 506. FIGS. 7F-7H show the extension of the propagating flame 506 induced to flow turbulently into the cylindrical wall 504 so that consumption of the boundary layer portion 507 of the air and natural gas by the propagating flame 506 in the combustion chamber 503 is increased and/or accelerated. Consumption of the boundary layer portion 507 reduces hydrocarbon emissions and improves combustion efficiency.

Figure 8A:
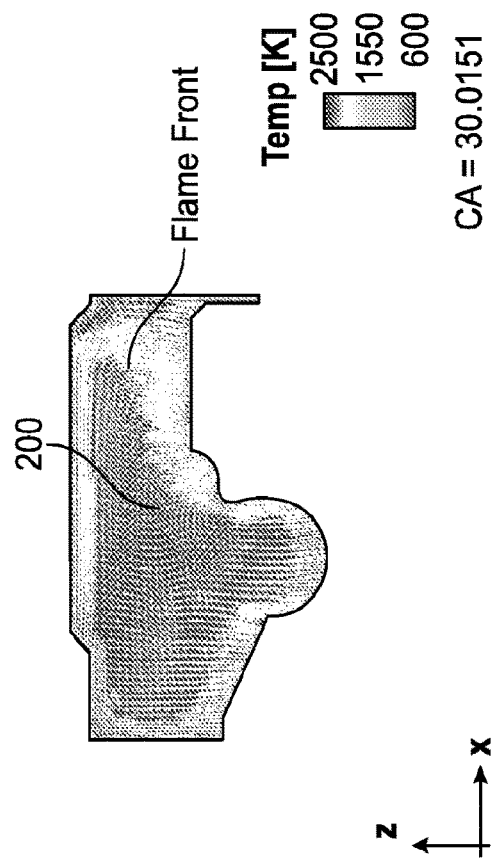
Figure 8B:
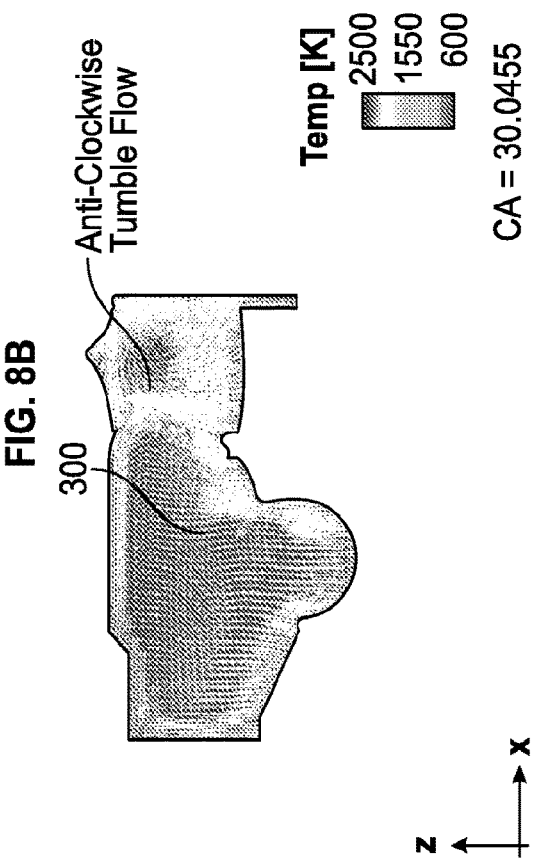
Figure 8C:
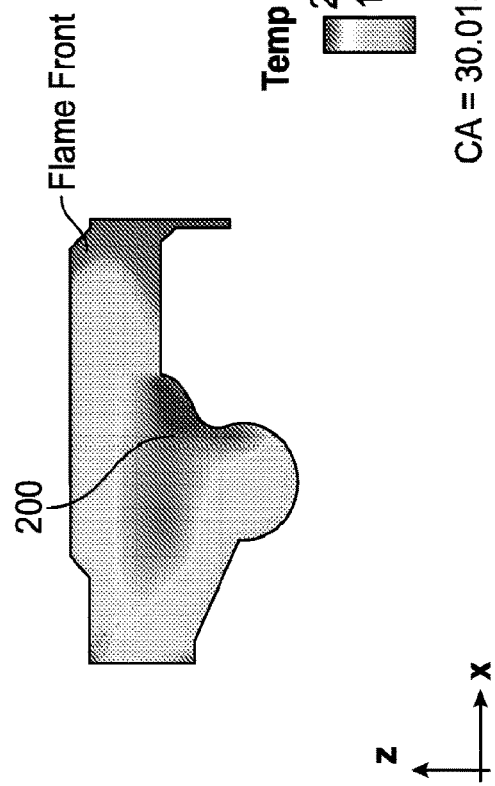
Figure 8D:
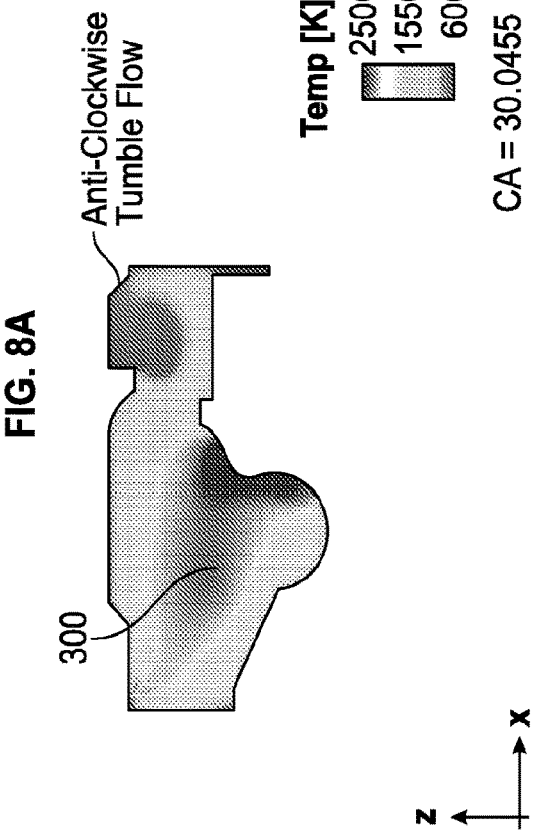

FIGS. 8A-8F are comparative views of cylinder combustion and gas flow patterns during combustion. FIGS. 8A and 8B show the cylinder system 200 at the crank angle of approximately 30 degrees. FIG. 8A shows combustion and FIG. 8B shows the gas flow pattern. FIGS. 8C and 8D show cylinder system 300 at the crank angle of approximately 30 degrees. FIG. 8C shows combustion and FIG. 8D shows the gas flow pattern. FIGS. 8E and 8F show the cylinder system 500 at the crank angle of approximately 30 degrees. FIG. 8E shows combustion and FIG. 8F shows the gas flow pattern. As demonstrated in the examples, each of the cylinder systems 300 and 500, which include at least one turbulence induction protuberance (e.g. 321, 322, 521), generate a tumble in the propagating flame, which accelerates and/or increases the consumption of the boundary layer portion of the fuel and air in the respective combustion chambers with respect to the cylinder system 200. Accordingly, FIGS. 8A-8F demonstrate how a system with one or more turbulence induction protuberance improves combustion efficiency and reduces hydrocarbon emissions. As shown in FIGS. 8C and 8D, the cylinder system 300 with a series of turbulence induction protuberances has a counterclockwise flow, and the cylinder system 500 with a single turbulence induction protuberance has a clockwise flow.

Figure 9A:
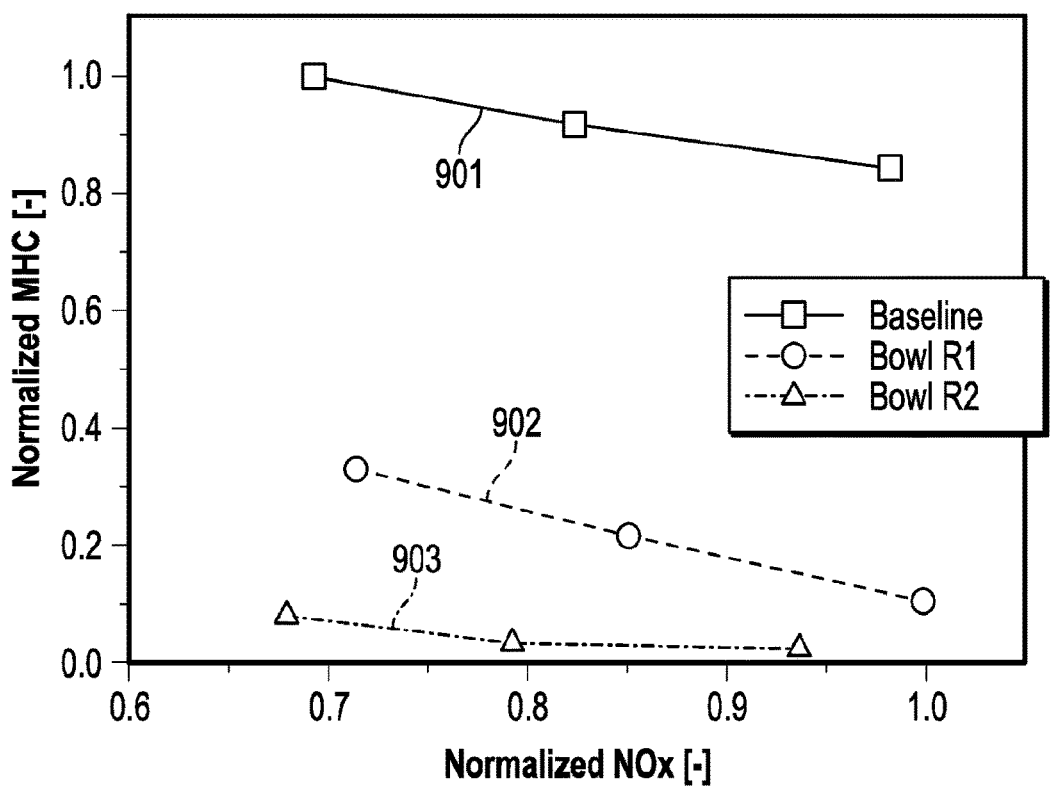
FIGS. 9A and 9B are graphs showing methane hydrocarbon (MHC) emissions non-methane hydrocarbon (NMHC) emissions for the cylinder systems of FIGS. 2, 3, and 5.
Figure 9B:
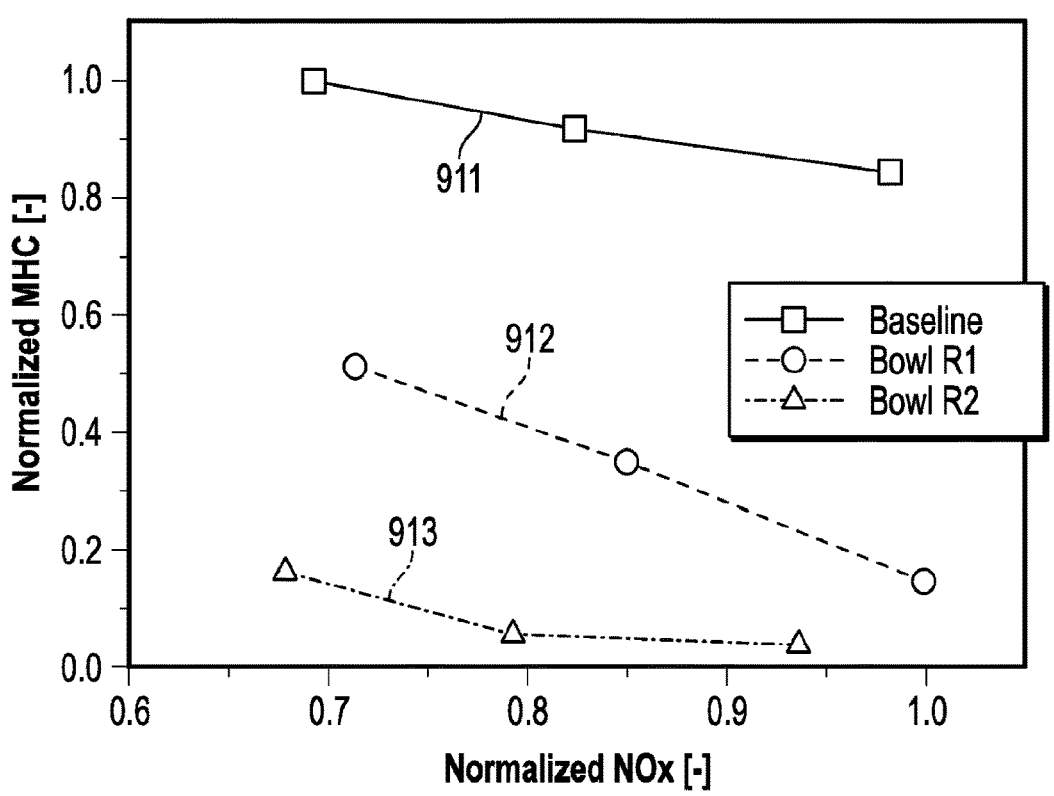

FIGS. 9A and 9B are graphs showing methane hydrocarbon (MHC) emissions and non-methane hydrocarbon (NMHC) emissions for the cylinder systems of FIGS. 2, 3, and 5. A curve 901 shows the MHC emissions of cylinder system 200. A curve 902 shows the MHC emissions of cylinder system 300. A curve 903 shows the MHC emissions of cylinder system 500. A curve 911 shows the NMHC emissions of cylinder system 200. A curve 912 shows the NMHC emissions of cylinder system 300. A curve 913 shows the NMHC emissions of cylinder system 500. FIGS. 9A-9B further demonstrate the effectiveness of the turbulence induction protuberances 321, 322, and 521 in reducing hydrocarbon emissions.

Figure 10:
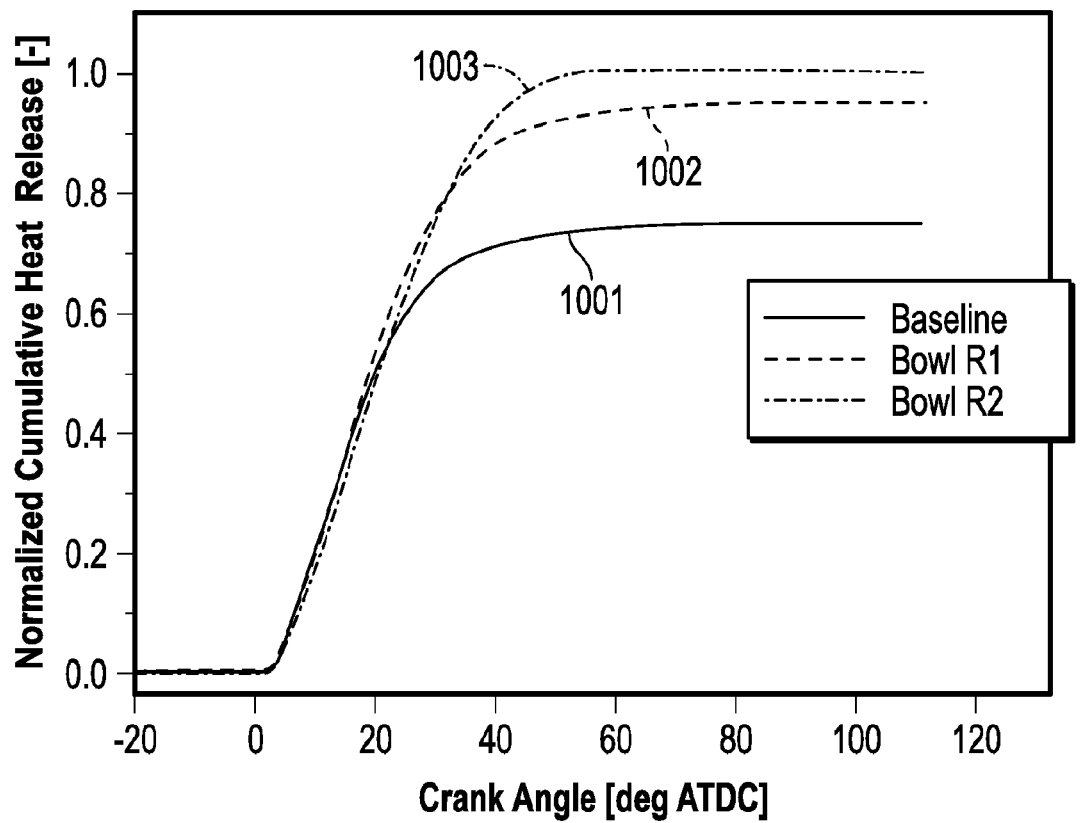
FIG. 10 is a graph showing the cumulative heat release of the cylinder system of FIGS. 2, 3 and 5.
Figure 11:
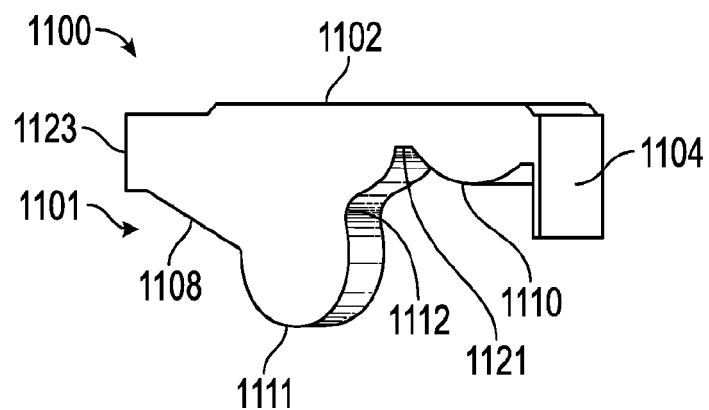
FIG. 11 is a perspective view of a cylinder and piston portion including a turbulence induction feature on the piston crown in accordance with an embodiment.

FIG. 10 is a graph showing the heat release of the cylinder system of FIGS. 2 and 3. FIG. 10 shows the normalized cumulative heat release with respect to the crank angle for the cylinder system 200, the cylinder system 300 and the cylinder system 500. A curve 1001 shows the cumulative heat release of the cylinder system 200. A curve 1002 shows the cumulative heat release of the cylinder system 300. A curve 1003 shows the cumulative heat release of the cylinder system 500. As demonstrated by FIG. 10, the cylinder system 300 including the turbulence induction protuberances 321 and 322 has a greater release of heat than the cylinder system 200. The greater release of heat of the cylinder system 300 represents a more complete combustion of the fuel within the engine and corresponds to greater combustion efficiency as more fuel is burned. Similarly, the greater release of heat of the cylinder system 500 represents a more complete combustion of the fuel within the engine and corresponds to greater combustion efficiency as more fuel is burned FIG. 11 is a perspective view of a cylinder and piston portion including a turbulence induction feature on the piston crown in accordance with yet another embodiment. In a manner similar to cylinder systems 300 and 500, cylinder system 1100 includes a piston 1101 that includes an angled "ski-jump" portion 1108, a curved piston bowl portion 1111, a fuel target portion 1112, and a piston turbulence induction protuberance 1121. However, in contrast to cylinder system 300, the piston turbulence induction protuberance 1121 extends into a peripheral piston bowl 1110 rather than a piston flat.

Figure 12:
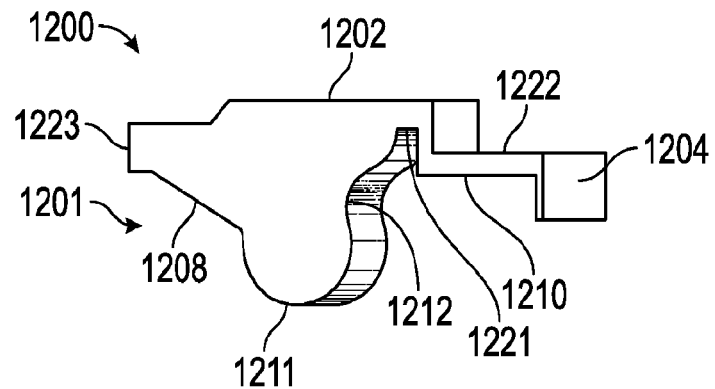
FIG. 12 is a perspective view of a cylinder and piston portion including turbulence induction features in accordance with an embodiment.

FIG. 12 is a perspective view of a cylinder and piston portion including turbulence induction features in accordance with an embodiment. In a manner similar to cylinder systems 300, 500, and 1100, cylinder system 1200 includes a piston 1201 that includes an angled ski jump portion 1208, a curved piston bowl portion 1211, a fuel target portion 1212, and a piston turbulence induction protuberance 1221. The cylinder system 1200 also includes a peripheral step 1222 that extends from the cylinder head portion 1201 and extends outward to the circumferential portion of the cylinder system 1200. While the turbulence induction protuberances have been illustrated with cylinder systems that include an angled ski jump portion, coupled to a curved piston bowl portion, and a fuel target portion, inventive embodiments may include other piston crown geometries.

Figure 13A:
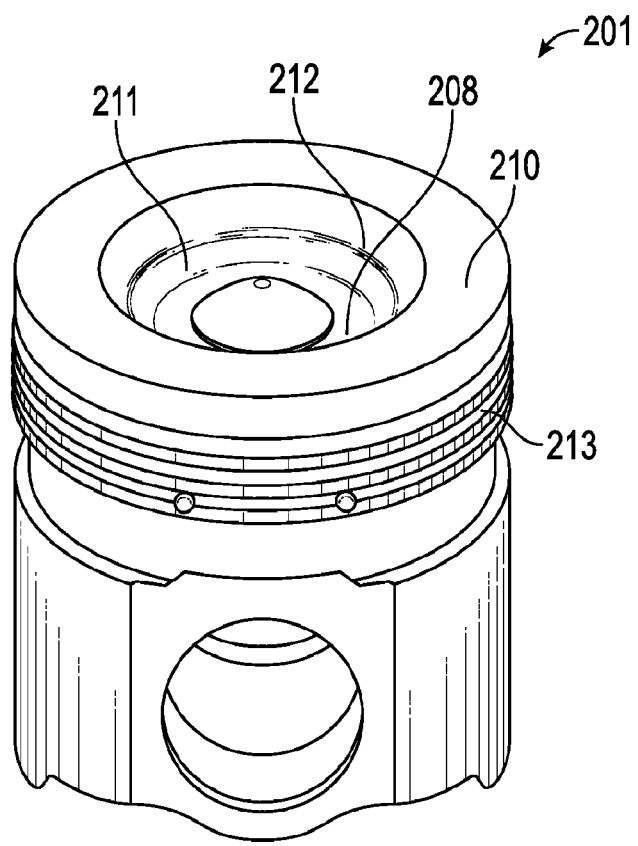
FIG. 13A is a perspective views of the piston of FIGS. 2A-2H.
Figure 13B:
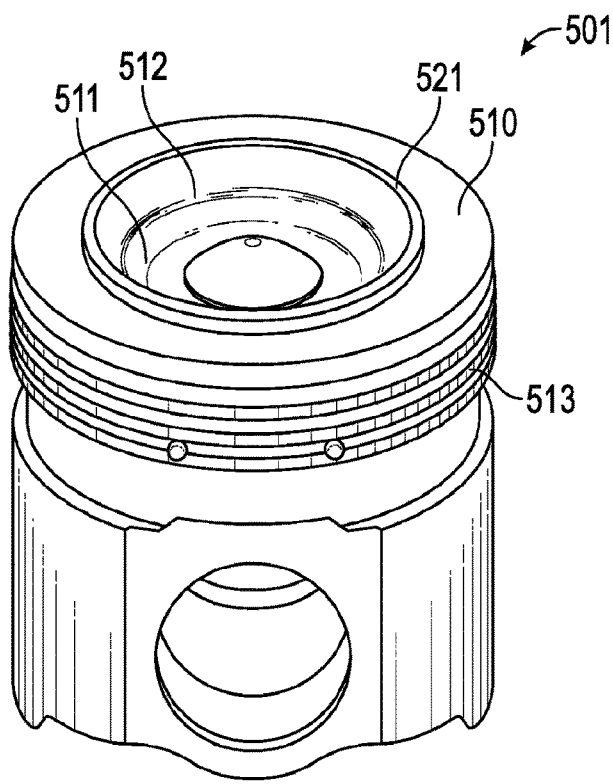
FIG. 13B is a perspective view of the piston of FIG. 5.
Figure 13C:
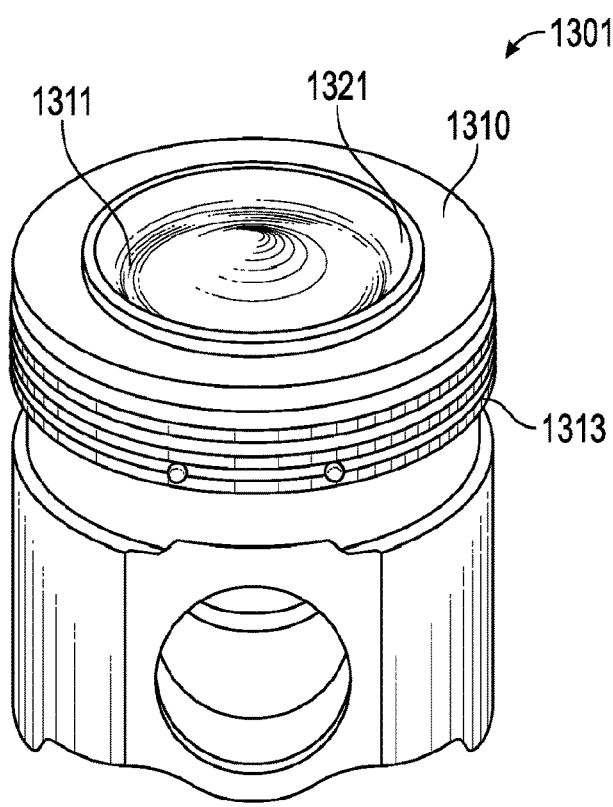
FIG. 13C is a perspective view of a piston according to another embodiment.

FIGS. 13A-13C are perspective views of the piston of FIGS. 2A-2H, and 5, as well as another embodiment, respectively. As described in connection with FIGS. 2A-2H the piston 201 includes then angled "ski jump" portion 208, the curved piston bowl portion 211, the fuel target portion 212, and the flat crown 210. The piston 201 may also include other piston features, including but not limited to piston ring grooves 213. As discussed herein, the piston 501, shown in part in FIGS. 5-7H, includes the piston turbulence induction protuberance 521, which extends from the piston crown 510. The piston 501 also includes the angled "ski-jump" portion 508, the curved piston bowl portion 511, the fuel target portion 512, and piston ring grooves 513.

FIG. 13C illustrates an embodiment of a piston 1301 including a piston turbulence induction protuberance 1321, but having a geometry commonly referred to as a "Mexican hat" that is distinct from pistons 501 and 201, namely a bowl portion 1311. As shown in FIG. 13C a turbulence induction protuberance may be implemented with various piston geometries in accordance with inventive embodiments. The piston turbulence induction protuberance 1321 extends from a piston crown 1310 of the piston 1301, which also includes piston ring grooves 1313.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

Non-limiting examples of various embodiments are disclosed herein. Features from one embodiments disclosed herein may be combined with features of another embodiment disclosed herein as someone of ordinary skill in the art would understand.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An internal combustion engine system comprising: a cylinder block including a cylinder bore; and a piston movably positioned in the cylinder bore, the piston slidable in an axial direction within the cylinder bore, the piston including a piston crown, the piston crown including a curved piston bowl portion positioned axially below the piston crown and a turbulence induction protuberance extending in an axial direction from the piston crown opposite the curved piston bowl portion, the turbulence induction protuberance positioned radially intermediate an axial center of the piston and a circumferential portion of the piston, the turbulence induction protuberance extending radially from the axial center toward a circumferential wall of the cylinder bore.

2. The system of claim 1, wherein the turbulence induction protuberance is configured to cause turbulence in a propagating flame propagating from a central region of the cylinder bore so as to cause the propagating flame to extend to a circumferential portion of the cylinder bore.

3. The system of claim 1, wherein the turbulence induction protuberance has a step profile.

4. The system of claim 1, wherein the turbulence induction protuberance includes a first side wall extending in the axial direction, a second side wall extending in the axial direction, and an upper wall extending in a radial direction and connecting the first side wall to the second side wall.

5. The system of claim 1, wherein the turbulence induction protuberance is positioned 60%-90% of a radial distance from the axial center of the piston to the circumferential portion of the piston.

6. The system of claim 1, wherein the turbulence induction protuberance has a height in the range of 4 mm to 6 mm.

7. The system of claim 2, further comprising a cylinder head including a cylinder head turbulence induction protuberance positioned radially intermediate an axial center of the cylinder bore and the circumferential portion of the cylinder bore.

8. The system of claim 7, wherein the cylinder head turbulence induction protuberance is radially intermediate the turbulence induction protuberance extending from the piston crown and the circumferential portion of the cylinder bore.

9. The system of claim 1, further comprising a dual fuel fuel injection system coupled to the cylinder block.

10. The system of claim 1, wherein the turbulence induction protuberance is positioned between a fuel target of the piston crown and a piston flat of the piston crown.

11. The system of claim 1, wherein the piston crown includes an angled ski jump portion extending from the axial center to the curved piston bowl portion.

12. An internal combustion engine system comprising: a cylinder block including a plurality of cylinder bores; and a plurality of pistons, each cylinder bore in the plurality of cylinder bores including a piston from the plurality of pistons, the piston slidable in an axial direction within the respective cylinder bore, the piston including a piston crown, the piston crown including a curved piston bowl portion positioned axially below the piston crown and a turbulence induction protuberance extending in an axial direction from the piston crown opposite the curved piston bowl portion, the turbulence induction protuberance positioned radially intermediate an axial center of the piston and a circumferential portion of the piston, the turbulence induction protuberance extending radially from the axial center toward a circumferential wall of the cylinder bore.

13. The system of claim 12, wherein the turbulence induction protuberance is configured to cause turbulence in a propagating flame propagating from a central region of the respective cylinder bore so as to cause the propagating flame to extend to a circumferential portion of the respective cylinder bore.

14. The system of claim 12, wherein the turbulence induction protuberance has a step profile.

15. The system of claim 13 or 14, wherein the turbulence induction protuberance is positioned between peripheral piston flat portion and a fuel target of the piston, the fuel target extending from the curved piston bowl portion.

16. The system of claim 15, wherein the piston includes an angled ski jump portion extending from the axial center to the curved piston bowl portion.

17. An internal combustion engine system subassembly, comprising: a cylinder block defining a cylinder bore; and a piston slidable in an axial direction within the cylinder bore, the piston including a piston crown, the piston crown including a curved piston bowl portion positioned axially below the piston crown and a turbulence induction protuberance extending in an axial direction from the piston crown opposite the curved piston bowl portion, the turbulence induction protuberance positioned radially intermediate an axial center of the piston and a circumferential portion of the piston, the turbulence induction protuberance extending radially from the axial center toward a circumferential wall of the cylinder bore.

18. The internal combustion engine system subassembly of claim 17, wherein the turbulence induction protuberance is configured to cause turbulence in a propagating flame propagating from a central region of the cylinder bore so as to cause the propagating flame to extend to a circumferential portion of the cylinder bore.

19. The internal combustion engine system subassembly of claim 18, wherein the turbulence induction protuberance has a step profile.

20. The internal combustion engine system subassembly of claim 18, wherein the turbulence induction protuberance is positioned 70%-80% of the radial distance from the axial center of the piston to the circumferential portion of the piston.

21. A method, comprising: causing a first fuel and intake air to enter an intake system of an internal combustion engine; drawing the first fuel and intake air into a cylinder bore of the internal combustion engine; injecting a second fuel into the cylinder bore so as to initiate ignition of a propagating flame; sliding a piston movably positioned in the cylinder bore in an axial direction within the cylinder bore; and interrupting propagation of the propagating flame via a turbulence induction protuberance extending in the axial direction from a piston crown of the piston, opposite a curved piston bowl portion positioned axially below the piston crown, so as to cause a turbulence in the propagating flame, the turbulence induction protuberance positioned radially intermediate an axial center of the piston and a circumferential portion of the piston, the turbulence induction protuberance extending radially from the axial center toward a circumferential wall of the cylinder bore.

22. The method of claim 21, wherein the turbulence caused by the turbulence induction protuberance causes the propagating flame to extend to a circumferential portion of the cylinder bore.

23. The method of claim 22, wherein the turbulence induction protuberance has a step profile.

24. The method of claim 22, further comprising interrupting propagation of the propagating flame via a cylinder head turbulence induction protuberance extending from a cylinder head coupled to the cylinder block, the cylinder head turbulence induction protuberance positioned radially intermediate an axial center of the cylinder bore and the circumferential portion of the cylinder bore.

25. An internal combustion engine system subassembly comprising: a piston including a piston crown, the piston crown including a curved piston bowl portion positioned axially below the piston crown and a turbulence induction protuberance extending in an axial direction from the piston crown opposite the curved piston bowl portion, the turbulence induction protuberance positioned radially intermediate an axial center of the piston and a circumferential portion of the piston.

\* \* \* \* \*